United States Patent
Ahn et al.

(10) Patent No.: US 7,738,165 B2
(45) Date of Patent: Jun. 15, 2010

(54) AMPLIFIED SPONTANEOUS EMISSION REFLECTOR-BASED GAIN-CLAMPED FIBER AMPLIFIER

(75) Inventors: Joon Tae Ahn, Daejeon (KR); Hong Seok Seo, Daejeon (KR); Woon Jin Chung, Seoul (KR); Bong Je Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/372,027

(22) Filed: Feb. 17, 2009

(65) Prior Publication Data

US 2009/0147350 A1 Jun. 11, 2009

Related U.S. Application Data

(62) Division of application No. 11/244,487, filed on Oct. 6, 2005, now Pat. No. 7,511,881.

(30) Foreign Application Priority Data

Oct. 7, 2004 (KR) ...................... 10-2004-0079870

(51) Int. Cl.
*H01S 3/00* (2006.01)
(52) U.S. Cl. .................. 359/337; 359/341.41
(58) Field of Classification Search ............. 359/337.2, 359/341.3, 341.41, 337
See application file for complete search history.

(56) References Cited

U.S. PATENT DOCUMENTS

| 5,963,361 | A | 10/1999 | Taylor et al. | |
|---|---|---|---|---|
| 5,991,068 | A * | 11/1999 | Massicott et al. | ........... 359/337 |
| 6,411,431 | B2 | 6/2002 | Sugaya et al. | |
| 6,456,428 | B1 | 9/2002 | Nakaji et al. | |
| 6,507,430 | B2 | 1/2003 | Yenjay | |
| 6,674,570 | B2 | 1/2004 | Song et al. | |
| 6,731,426 | B2 | 5/2004 | Yenjay et al. | |
| 6,738,182 | B2 * | 5/2004 | Inagaki et al. | ............. 359/337.1 |
| 6,934,078 | B2 | 8/2005 | Hwang et al. | |

(Continued)

FOREIGN PATENT DOCUMENTS

JP 11-307855 A 11/1999

(Continued)

OTHER PUBLICATIONS

L.L.Yi, et al; "Gain-Clamped Erbium-Doped Fiber-Ring Lasing Amplifier With Low Noise Figure by Using an Interleaver", IEEE Photonics Technology Letters, vol. 15, No. 12, Dec. 2003, pp. 1695-1697.

(Continued)

*Primary Examiner*—Mark Hellner
(74) *Attorney, Agent, or Firm*—Ladas & Parry LLP

(57) ABSTRACT

Provided is an all-optical gain-clamped fiber amplifier, comprising transmission and isolation means for periodically transmitting an optical signal or reflecting amplified spontaneous emission (ASE) back to a gain medium. The transmission and isolation means can be embodied by an optical interleaver or a number of optical fiber Bragg gratings. Accordingly, an optical signal can be amplified across the entire C-band, and an ASE reflector-based gain-clamped fiber amplifier having a wider dynamic range than conventional amplifiers can be implemented.

12 Claims, 6 Drawing Sheets

U.S. PATENT DOCUMENTS

| | | |
|---|---|---|
| 7,081,989 B2 | 7/2006 | Song et al. |
| 7,139,119 B1 | 11/2006 | Starodoumov et al. |
| 2001/0033411 A1 | 10/2001 | Shiota et al. |
| 2002/0003655 A1 | 1/2002 | Park et al. |
| 2003/0035204 A1 | 2/2003 | Ahn et al. |
| 2003/0044111 A1 | 3/2003 | Oberland |
| 2003/0161033 A1 | 8/2003 | Hwang et al. |
| 2004/0246567 A1 | 12/2004 | Ahn et al. |
| 2005/0099675 A1 | 5/2005 | Lee et al. |
| 2005/0135438 A1 | 6/2005 | Kim et al. |
| 2006/0082867 A1 | 4/2006 | Starodoumov et al. |

FOREIGN PATENT DOCUMENTS

| | | |
|---|---|---|
| KR | 10-0201009 B1 | 3/1999 |
| KR | 1020040106904 A | 12/2004 |

OTHER PUBLICATIONS

M.A. Mahdi, et al; "All Optical Gain-Locking in Erbium-Doped Fiber Amplifiers Using Double-Pass Superfluorescence", IEEE Photonics Technology Letters, Vol. 11, No. 12, Dec. 1999, pp. 1581-1583.

Joon Tae Ahn, et al; "All-Optical Gain-Clamped Erbium Doped Fiber Amplifier With Improved Noise Figure and Freedom From Relaxation Oscillation", IEEE Photonics Technology Letters, vol. 16, No. 1, Jan. 2004, pp. 84-86.

Joon Tae Ahn, et al; "Characterization of an ASE Reflector-Based Gain-Clamped Erbium-Doped Fiber Amplifier", IEEE Photonics Technology Letters, vol. 17, No. 3, Mar. 2005, pp. 555-557.

Joon Tae Ahn, et al; "ASE Reflector-Based Gain-Clamped Erbium-Doped Fiber Amplifier Using an Optical Interleaver", IEEE Photonics Technology Letters, vol. 17, No. 8, Aug. 2005, pp. 1632-1634.

G. Luo, et al; "Experimental and Theoretical Analysis of Relaxation-Oscillations and Spectral Hole Burning Effects in All-Optical Gain Clamped EDFA's for WDM Networks", Journal of Lightwave Technology, vol. 16, No. 4, Apr. 1998, pp. 527-533.

S.W. Harun, et al; "Gain Clamping in *L*-Band Erbium-Doped Fiber Amplifier Using a Fiber Bragg Grating", IEEE Photonics Technology Letters, vol. 14, No. 3, Mar. 2002, pp. 293-295.

* cited by examiner

AMPLIFIED SPONTANEOUS EMISSION REFLECTOR-BASED GAIN-CLAMPED FIBER AMPLIFIER

CROSS-REFERENCE TO RELATED APPLICATION

This application claims priority to and the benefit of Korean Patent Application No. 2004-79870, filed on Oct. 7, 2004, the disclosure of which is incorporated herein by reference in its entirety.

BACKGROUND

1. Field of the Invention

The present invention relates to a fiber amplifier that amplifies an input optical signal in an optical communication system, and more specifically, to an amplified spontaneous emission (ASE) reflector-based gain-clamped fiber amplifier that maintain a certain gain characteristic even when the intensity of the input optical signal varies.

2. Discussion of Related Art

An optical amplifier, such as a semiconductor optical amplifier and a fiber amplifier, which is an optical device that amplifies an input optical signal, is necessary for compensating for optical loss during transmission through optical fiber or various optical devices used in the field of optical transmission and networking.

However, communication quality in an optical network is not good due to the drawback that the degree of amplification of the conventional optical amplifier varies according to the intensity of the input optical signal. Thus, a gain-clamped fiber amplifier has been developed to solve this problem.

An all-optical gain-clamped fiber amplifier in which a gain is optically clamped using a laser cavity does not have a complicated signal process for clamping the gain. Laser oscillation occurs when a loss and a gain generated from the cavity are the same, and once oscillating, amplitude of population inversion of a gain medium is clamped. The gain of the fiber amplifier is proportional to the amplitude of the population inversion and a length of the gain medium, so that when the laser oscillation occurs, the gain of the amplifier is clamped. When an optical signal is input to the fiber amplifier in which the gain is clamped with the laser oscillation, even if the input optical signal is weak, the gain remains constant regardless of the intensity of the optical signal, and if the intensity of the input optical signal grows stronger, the laser oscillation is paused and the gain-clamped characteristic of the fiber amplifier disappears.

FIG. 1 shows an example of the conventional gain-clamped fiber amplifier using laser oscillation.

An optical fiber is used as a gain medium 1, and a pump light is supplied from a laser diode (LD) 3 through a wavelength division multiplexed (WDM) coupler 2. Using the coupler 4 at input and output stages, an optical attenuator (ATT) 5, an optical isolator (ISO) 6, and a transmission type optical filter (BPF) 7 constitute a ring cavity. The transmission type optical filter 7 adjusts a wavelength at which the laser oscillation occurs, the optical isolator 6 causes oscillation in the ring cavity to occur only in one direction, and the optical attenuator 5 adjusts the gain of the amplifier by controlling optical loss in the cavity.

In the fiber amplifier shown in FIG. 1, the intensity of the input optical signal and the intensity of the laser optical signal generated therein have a complementary relationship. In other words, when the intensity of the input optical signal is small, the intensity of the laser oscillated light is large, and as the intensity of the input optical signal grows larger, the intensity of the laser oscillated light grows smaller. Thus, even when the intensity of the input optical signal changes, the amplification ratio remains substantially constant. Here, when the intensity of the input optical signal grows to a certain level, the laser stops oscillating and the gain thereof decreases like a common fiber amplifier.

However, in the gain-clamped fiber amplifier using the laser cavity described above, when the intensity of the input optical signal varies, the intensity of the optical signal temporarily fluctuates due to a relaxation oscillation in the laser cavity. Such a temporary fluctuation in optical signal intensity has an effect on a bit error rate (BER) of transmitted data. In addition, a frequency of the relaxation oscillation depends on the gain medium and the length of the cavity, thereby making it difficult to fabricate the fiber amplifier and limiting an optical signal transmission rate and processing speed.

To solve this problem caused by the laser cavity, the gain-clamped fiber amplifier using an amplified spontaneous emission (ASE) reflector that causes ASE to be incident back upon the gain medium, rather than the laser cavity, has been developed.

The greater the intensity of the optical signal input for amplification, the lesser the intensity of the ASE. Further, the intensity of the ASE reflected by the reflector is proportional to the intensity of the ASE. In other words, when the intensity of the input optical signal is small, the intensity of the ASE becomes so large that the intensity of the ASE reflected by the reflector becomes large, while when the intensity of the input optical signal is large, the intensity of the ASE becomes so small that the intensity of the ASE reflected by the reflector becomes small. Consequently, the input optical signal and the reflected ASE are amplified in the gain medium, in which each contributes to the gain. Here, the intensity changes of two beams are opposite to each other, the gain remains almost the same until the intensity of the input optical signal grows to a certain level, and when the intensity of the input optical signal increases further, the gain of the amplifier is reduced. For convenience, when the clamped gain is lowered by 1 dB, the intensity of the input optical signal is defined as a dynamic range.

An ASE reflector gain-clamped Erbium-doped fiber amplifier (EDFA) using a reflector in which a mirror is coupled to a 1530 nm CWDM (Coarse WDM) is disclosed in Joon Tae Ahn, et al., "All-Optical Gain-Clamped EDFA With Improved Noise Figure and Freedom From Relaxation Oscillation", IEEE Photonics Technology Letters, Vol. 16 No. 1, pp. 84-86, 2004. 1. In this amplifier, the stronger the reflected ASE, the wider the dynamic range. Thus, to obtain a strong reflected ASE, a wavelength of 1531 nm, at which the ASE is the strongest, was included, and 1530 nm CWDM having a transmission wavelength band of 1521 to 1539 nm was used to reflect the wavelength as wide as possible. An input optical signal having a wavelength of 1550 nm was used and the gain was measured, so that the gain-clamped characteristic could be obtained and the dynamic range was about 12 dBm. In addition, with respect to the switching characteristic according to the change of the input optical signal, the relaxation oscillation observed in the conventional laser oscillated gain-clamped fiber amplifier was not seen. However, this amplifier has a drawback in that the 1530 to 1540 nm wavelength portion of the Conventional band (C-band) defined as 1530 to 1565 nm is not amplified due to the 1530 nm CWDM used for the wide dynamic range.

SUMMARY OF THE INVENTION

The present invention is directed to an ASE reflector-based gain-clamped fiber amplifier capable of amplifying optical signals across the entire C-band.

The present invention is also directed to an ASE reflector-based gain-clamped fiber amplifier with a broader dynamic range than the conventional fiber amplifier.

The present invention is also directed to an ASE reflector-based gain-clamped fiber amplifier with a lower noise figure factor than the conventional fiber amplifier.

One aspect of the present invention provides an amplified spontaneous emission (ASE) reflector-based gain-clamped fiber amplifier comprising: a gain medium used for amplifying a C-band (1530 to 1565 nm) optical signal; a laser diode for supplying pump light to perform population inversion of the gain medium; a coupler for coupling the pump light to the gain medium; and transmission and isolation unit for periodically transmitting an optical signal provided from the outside to send to the gain medium, and reflecting ASE having a different wavelength from the optical signal back to the gain medium.

Another aspect of the present invention provides an amplified spontaneous emission (ASE) reflector-based gain-clamped fiber amplifier comprising: a gain medium used for amplifying an optical signal; a laser diode for supplying pump light to perform population inversion of the gain medium; a coupler for coupling the pump light to the gain medium; and transmission and isolation unit for periodically transmitting the optical signal amplified from the gain medium to output to the outside, and reflecting ASE having a different wavelength from the optical signal back to the gain medium.

Still another aspect of the present invention provides an amplified spontaneous emission (ASE) reflector-based gain-clamped fiber amplifier comprising: a gain medium used for amplifying an optical signal; a laser diode for supplying pump light to perform population inversion of the gain medium; a coupler for coupling the pump light to the gain medium; first transmission and isolation unit for periodically transmitting an optical signal provided from the outside to send to the gain medium, and reflecting ASE having a different wavelength from the optical signal back to the gain medium; and second transmission and isolation unit for periodically transmitting the optical signal amplified from the gain medium to output to the outside, and reflecting ASE having a different wavelength from the optical signal back to the gain medium.

Another aspect of the present invention provides an amplified spontaneous emission (ASE) reflector-based gain-clamped fiber amplifier comprising: a gain medium capable of amplifying a C-band (1530 to 1565 nm) optical signal; a laser diode for supplying pump light to perform population inversion of the gain medium; a coupler for coupling the pump light to the gain medium; transmission and isolation unit for periodically transmitting an optical signal provided from the outside to send to the gain medium, and reflecting ASE having a different wavelength from the optical signal back to the gain medium, wherein the transmission and isolation unit comprises: a reflection mirror; and an optical interleaver for periodically transmitting the optical signal, isolating the ASE to send to the reflection mirror, and sending the ASE reflected by the reflection mirror to the gain medium; an amplifier located between the reflection mirror and the optical interleaver for amplifying the ASE.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

A gain-clamped fiber amplifier using laser oscillation has a drawback in that a bit error rate (BER) of a transmitted optical signal is increased due to relaxation oscillation of a laser cavity. Meanwhile, an ASE reflector-based gain-clamped fiber amplifier solves the relaxation oscillation problem by not using the laser cavity but has a drawback in that a signal in the wavelength range of 1530 to 1540 nm of the C-band defined as 1530 to 1565 nm is not amplified due to 1530 nm CWDM used to obtain a wide dynamic range. Therefore, the present invention is directed to an ASE reflector-based gain-clamped fiber amplifier capable of expanding an amplified wavelength band and a dynamic range.

Exemplary embodiments of the present invention will now be described in detail with reference to the accompanying drawings. The following embodiments are provided so that those skilled in the art can obtain a thorough understanding of the present invention. However, a variety of modifications can be made to the described embodiments without departing from the spirit and scope of the present invention. Thus, the following description should be considered for explanatory purposes only and not construed as limiting the scope of the present invention.

Figure 1:
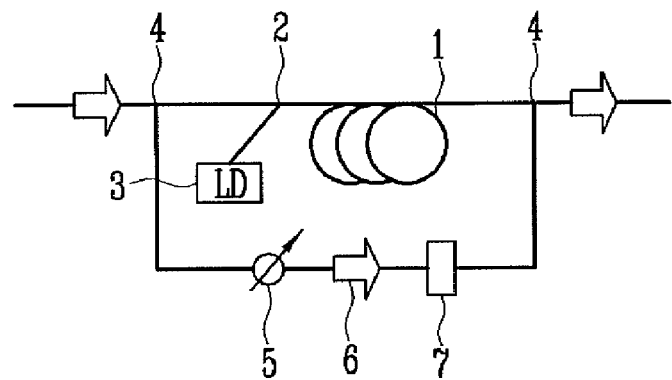
FIG. 1 is a schematic diagram of a conventional gain-clamped Erbium-doped fiber amplifier using laser oscillation.
Figure 2:
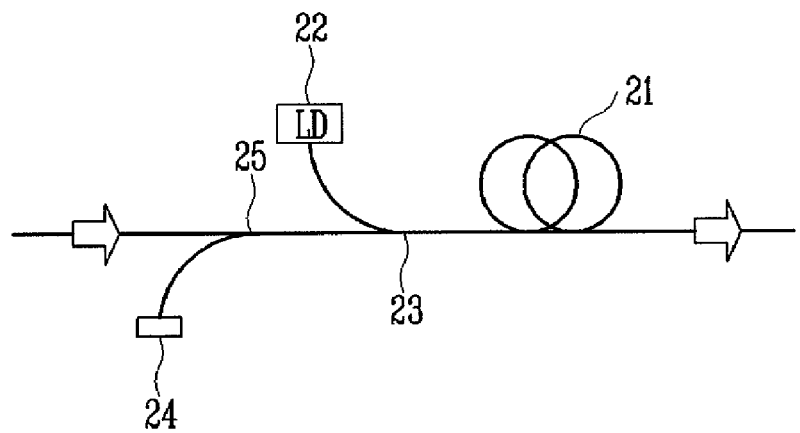
FIG. 2 is a schematic diagram of an amplified spontaneous emission (ASE) reflector-based gain-clamped fiber amplifier according to a first embodiment of the present invention.

FIG. 2 is a schematic diagram of an amplified spontaneous emission (ASE) reflector-based gain-clamped fiber amplifier according to a first embodiment of the present invention.

As a gain medium 21 for amplifying an optical signal, for example, an Erbium-doped fiber (EDF) is used. A laser diode (LD) 22 provides pump light having a center wavelength of, for example, 980 nm, for population inversion of the gain medium 21, and a wavelength division multiplexing (WDM) coupler 23 couples the pump light provided from the laser diode (LD) 22 to the gain medium 21. In addition, a transmission and isolation unit 25 is arranged at an input stage to periodically transmit the optical signal provided from the outside to send to the gain medium 21 through the WDM coupler 23 and send ASE having a different wavelength from the optical signal coming back from the gain medium 21 to a reflection mirror 24.

When the pump light provided from the laser diode (LD) 22 is incident on the gain medium 21 through the WDM coupler 23, each atomic energy level of the gain medium 21 is changed from a ground state to an excited state. An excited atom emits light through stimulated emission, in which light having the same wavelength as the optical signal is emitted, and spontaneous emission, in which light having any wavelength is emitted, so that the atom returns to the ground state. Therefore, when the pump light is incident on the gain medium 21, the optical signal incident from the outside is amplified through the stimulated emission. At this time, light spontaneously emitted from the gain medium 21 is amplified while propagating through the gain medium 21, which is referred to as ASE. The ASE propagates parallel and antiparallel to the pump light, and the intensity of the ASE propagating in the opposite direction as the pump light is typically larger than that propagating in the same direction as the pump light. Using this property, the ASE propagating in the opposite direction as the pump light is isolated by the transmission and isolation unit 25 and directed toward the reflection mirror 24 where it is reflected to be incident again on the gain medium 21 and amplified again. Here, when the intensity of the input optical signal is low, the ASE becomes so strong that the intensity of the ASE reflected from the reflection mirror 24 is large. In contrast, when the intensity of the input optical signal is large, the ASE becomes weak so that the intensity of the ASE reflected back from the reflection mirror 24 is small. Therefore, in the gain medium 21, the optical signal is always amplified with a constant gain due to complementary interaction between the input optical signal and the ASE reflected by the reflection mirror 24.

Figure 3:
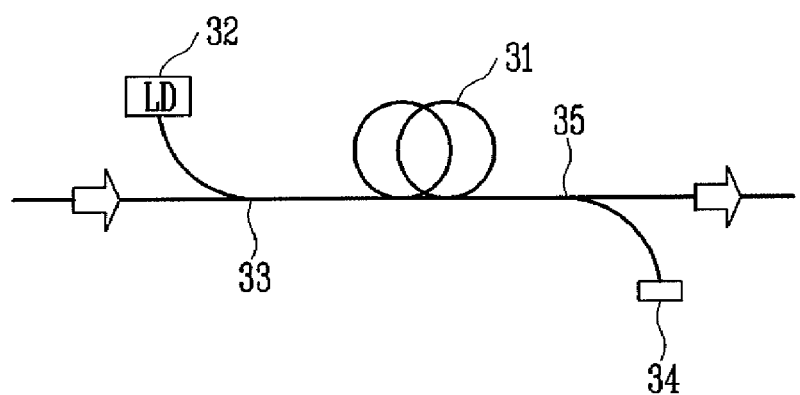
FIG. 3 is a schematic diagram of an amplified spontaneous emission (ASE) reflector-based gain-clamped fiber amplifier according to a second embodiment of the present invention.

FIG. 3 is a schematic diagram of an amplified spontaneous emission (ASE) reflector-based gain-clamped fiber amplifier according to a second embodiment of the present invention;

As a gain medium 31 for amplifying an optical signal, for example, an Erbium-doped fiber (EDF) is used. A laser diode (LD) 32 provides pump light having a center wavelength of, for example, 980 nm, for population inversion of the gain medium 31, and a wavelength division multiplexing (WDM) coupler 33 couples the pump light provided from the laser diode (LD) 32 to the gain medium 31. In addition, a transmission and isolation unit 35 is arranged at an output stage to periodically transmit the optical signal amplified from the gain medium 31 to output to the outside and send ASE having a different wavelength from the optical signal from the gain medium 31 to a reflection mirror 34.

When the pump light provided from the laser diode (LD) 32 is incident on the gain medium 31 through the WDM coupler 33, each atomic energy level of the gain medium 31 is changed from a ground state to an excited state. The excited atom emits light through stimulated emission, in which light having the same wavelength as the optical signal is emitted, and spontaneous emission, in which light having any wavelength is emitted, so that the atom returns to the ground state. Therefore, when the pump light is incident on the gain medium 31, the optical signal incident from the outside is amplified through the stimulated emission. Here, light spontaneously emitted from the gain medium 31, i.e., the ASE propagating in the same direction as the pump light, is isolated by the transmission and isolation unit 35 and directed toward the reflection mirror 34 where it is reflected to be incident again on the gain medium 31. Therefore, the optical signal is always amplified with a constant gain due to the complementary relationship between the input optical signal and the ASE reflected by the reflection mirror 34.

The reflection mirrors 24 and 34 may be made of a typical mirror or an optical fiber having an end surface coated with dielectric, and the transmission and isolation units 25 and 35 may comprise, for example, an optical interleaver. The optical interleaver acts as a multiplexer (MUX) combining two columns of optical signals consisting of optical signals arranged in periodic wavelengths and deviated with each other by a half of the wavelength to one column of optical signals having a half period of the original one. Alternatively, the optical interleaver acts as a demultiplexer (DEMUX) separating one column of optical signals arranged in periodic wavelengths to two columns of optical signals having a twice period of the original one and deviated with each other by the original period.

A central frequency of the optical signal available in the C-band is determined to have an interval of 50 GHz (about 0.4 nm wavelength gap) in accordance with the ITU-T standard. The optical interleaver, such as a 50 GHz interleaver capable of dividing one column of current optical signals having a gap of 50 GHz into two columns of optical signals having a gap of 100 GHz, or combining two columns of optical signals having a gap of 100 GHz into one column of signals having a gap of 50 GHz, as well as 100 and 200 interleaver products, are commercially available.

While Erbium-doped fiber (EDF) is used as a gain medium in FIGS. 2 and 3, in addition to Erbium-doped fiber (EDF), a rare earth ion optical fiber, a fiber Raman optical amplifier, and a semiconductor optical amplifier (SOA) can each be used as the gain medium. In addition, while it is advantageous with respect to the noise figure to use laser diodes 22 and 32 that generate pump light having a center frequency of 980 nm, laser diodes 22 and 32 that generate a center frequency of 1480 nm can also be used. Further, an optical isolator that causes light propagating in one direction of an input stage and an output stage, respectively, to be transmitted and light propagating in a reverse direction to be absorbed, can be further arranged.

In addition, as shown in FIG. 3, the reflection mirror 34 and the transmission and isolation unit 34 can be arranged at the output stage of the fiber amplifier shown in FIG. 2. In this case, the transmission and isolation unit 25 arranged at the input stage and the transmission and isolation unit 35 arranged at the output stage should be configured to reflect the ASE having different wavelengths.

Figure 4A:
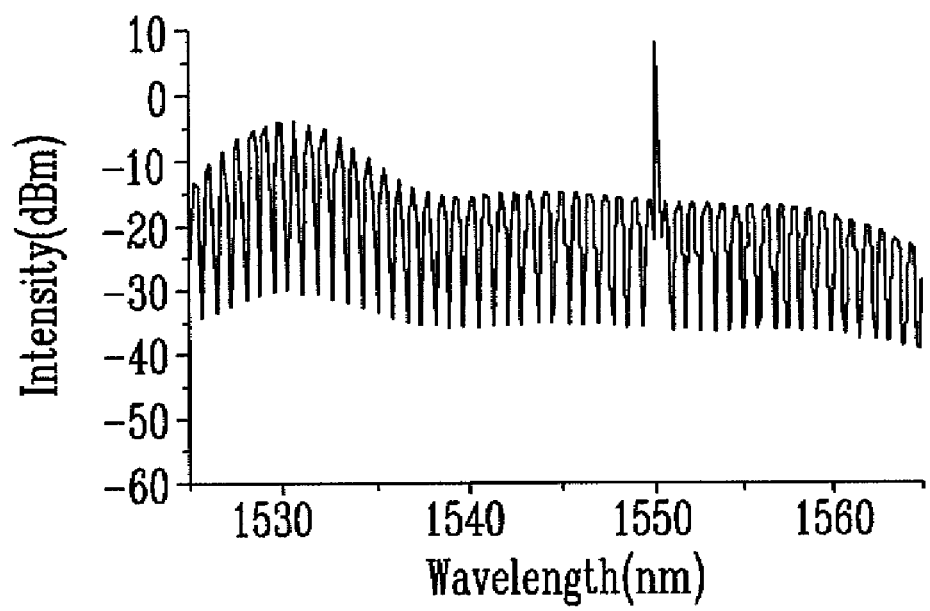
FIGS. 4A to 4C show output spectra of an amplified spontaneous emission (ASE) reflector-based gain-clamped fiber amplifier according to the present invention.
Figure 4B:
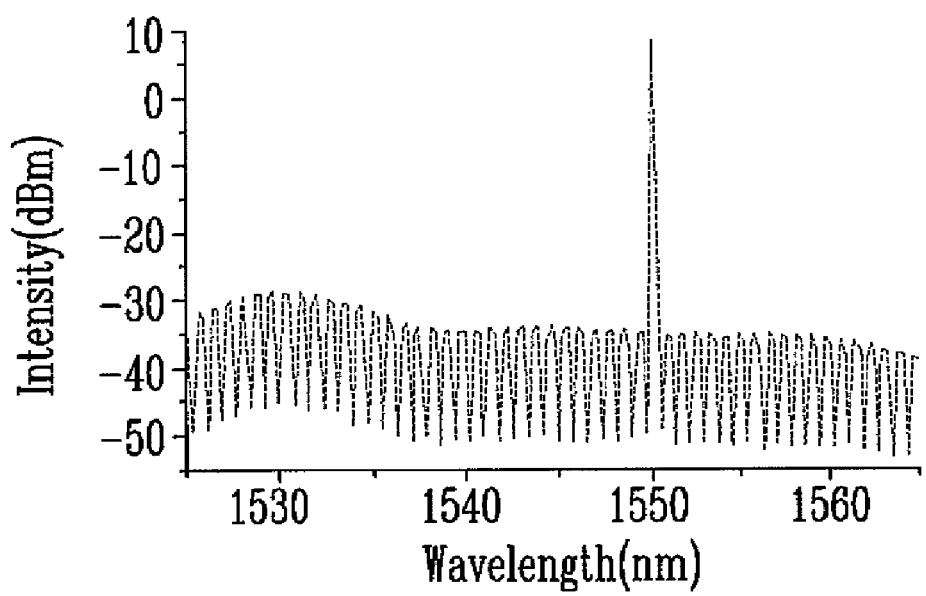
Figure 4C:
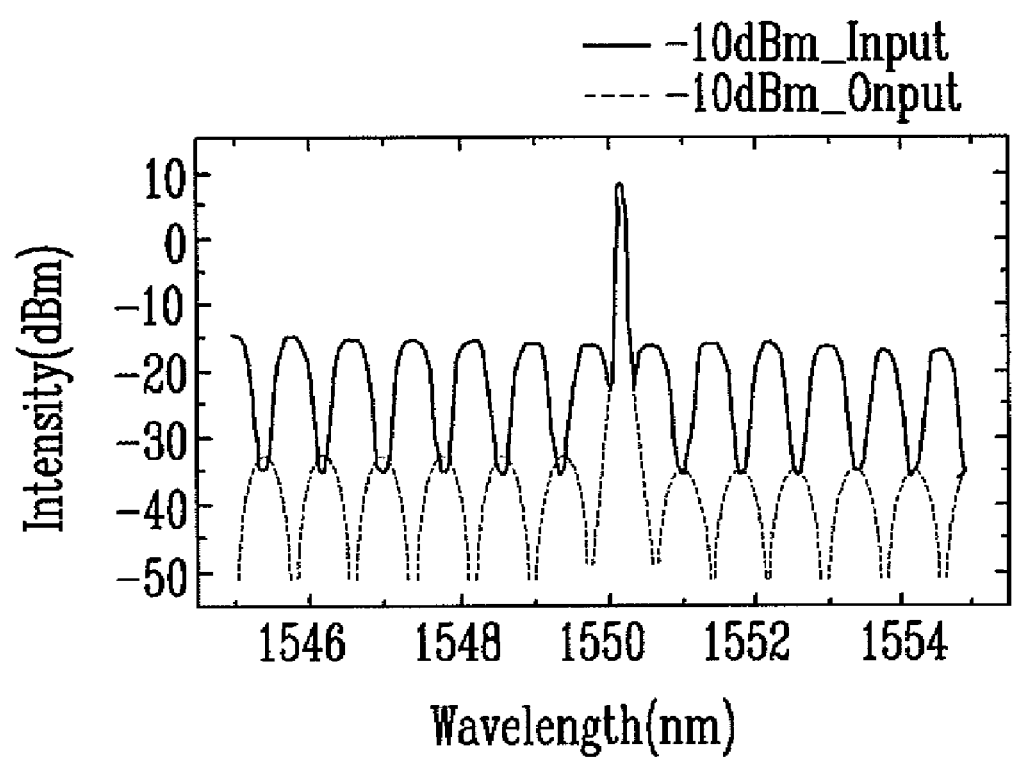

FIGS. 4A to 4C show output spectra of an amplified spontaneous emission (ASE) reflector-based gain-clamped fiber amplifier according to the present invention, in which a 50 GHz interleaver is used as the transmission and isolation units 24 and 35 and an input optical signal has a wavelength of 1550.12 nm and an intensity of 10 dBm.

FIG. 4A shows the output spectrum of the fiber amplifier shown in FIG. 2, FIG. 4B shows the output spectrum of the fiber amplifier shown in FIG. 3, and FIG. 4C is an enlargement of a portion of the spectra shown in FIGS. 4A and 4B.

Since the 50 GHz interleaver was used, the intensity of the ASE was modulated with a gap of 100 GHz, i.e., with a wavelength gap of about 0.8 nm. The optical signal should be transmitted while reflecting the ASE, so it can be appreciated that the amplified optical signal is located at a trough of the modulated ASE for the amplifier of FIG. 2 and at a ridge of the modulated ASE for the amplifier of FIG. 3. Therefore, with the optical interleaver having an appropriate wavelength gap characteristic that allows the optical signals intended for amplification to be transmitted, the optical signals can be amplified across the entire C-band. In addition, the ASE can be reflected across a wavelength range corresponding to half of the C-band, as a whole, in addition to around 1531 nm where the ASE of the Erbium-doped fiber (EDF) is the strongest, so that the intensity of the reflected ASE is greater than in the conventional amplifiers. In addition, the fiber amplifier of the present invention has a wider dynamic range than the conventional fiber amplifier.

Figure 5A:
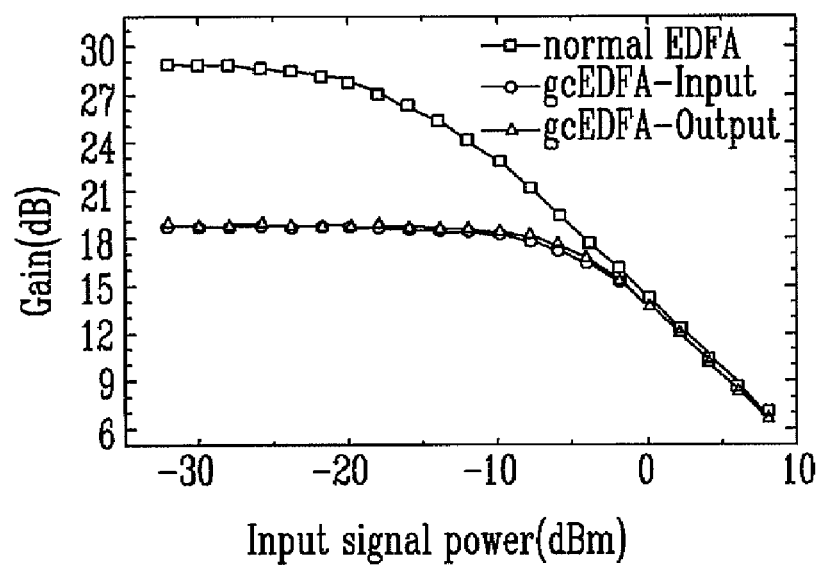
FIGS. 5A and 5B are graphs for comparing amplification characteristics of an amplified spontaneous emission (ASE) reflector-based gain-clamped fiber amplifier according to the present invention and a conventional fiber amplifier.
Figure 5B:
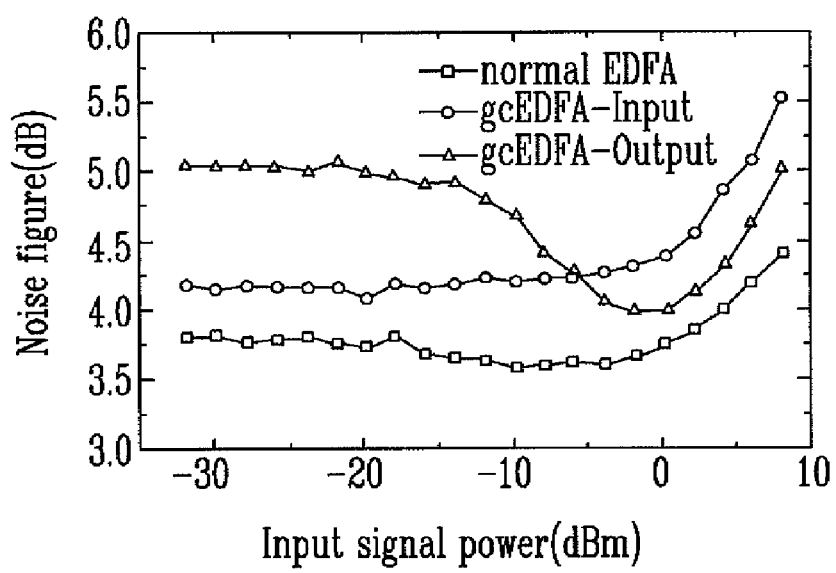

FIGS. 5A and 5B are graphs of gain and noise figure measurements versus intensity of input optical signal for two cases where an optical signal having a wavelength of 1550.12 nm is input to the ASE reflector-based gain-clamped fiber amplifier according to the embodiments of the present invention shown in FIGS. 2 and 3, and to the conventional Erbium-doped fiber amplifier without gain clamp.

Referring to FIG. 5A, the gain-clamped characteristic, meaning that the gain does not change even when the intensity of the input optical signal varies, is apparent for the amplifiers of FIG. 2 (circles) and FIG. 3 (triangles). Both cases have almost the same clamped gain of 19 dB and dynamic range of about 7 dBm, which constitutes an improvement of several dB compared to the conventional amplifier, as expected.

Referring to FIG. 5B, the noise figure for the amplifier of FIG. 2 (circles) is better than that for the amplifier of FIG. 3 (triangles) in the dynamic range, but both are worse than for the amplifier without clamped gain.

Figure 6A:
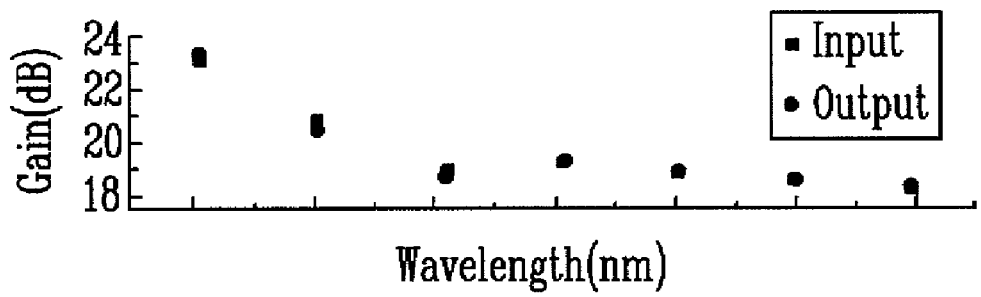
FIGS. 6A-6C are graphs for illustrating amplification characteristics of an amplified spontaneous emission (ASE) reflector-based gain-clamped fiber amplifier according to preferred embodiments of the present invention.
Figure 6B:
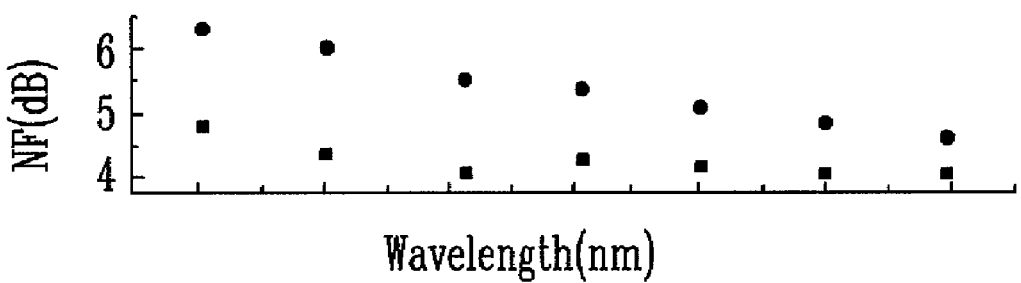
Figure 6C:
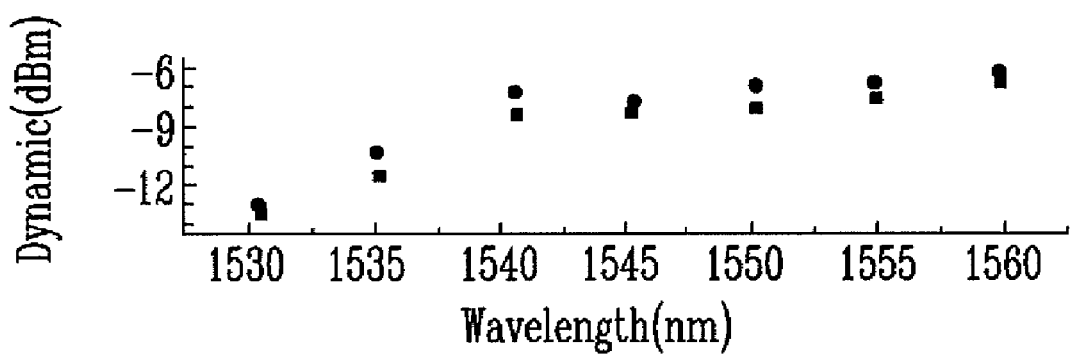

FIGS. 6A and 6B are graphs illustrating amplification characteristics of an ASE reflector-based gain-clamped fiber amplifier according to the present invention. Clamped gain is plotted in FIG. 6A, noise figure is plotted in FIG. 6B, and dynamic range is plotted in FIG. 6C, for the amplifiers of FIG. 2 (rectangles) and FIG. 3 (circles), versus wavelength of an input optical signal having an intensity of about 22 dBm.

Clamped gains for the amplifiers of FIGS. 2 and 3 are similar across the entire range of wavelengths. In contrast, the noise figure of the amplifier of FIG. 2 is smaller than that of the amplifier of FIG. 3 by about 0.7 to 1.5 dB, and the dynamic range of the amplifier of FIG. 3 is larger than that of the amplifier of FIG. 2 by about 1 dB.

While in the described embodiments of the present invention, an optical interleaver having a periodic transmission and isolation characteristic is used as an ASE reflector-based gain-clamped fiber amplifier capable of amplifying optical signals across the entire C-band, a number of fiber Bragg gratings (FBG) may be used instead to reflect the ASE. In this case, since the optical signal should be transmitted while reflecting the ASE, the fiber Bragg gratings (FBG) must have a center wavelength that is different from a wavelength of the optical signal. In addition, as the intensity of the reflected ASE increases, the dynamic range of the amplifier increases. Thus, it has the advantage of increased dynamic range when the reflection wavelengths of a number of fiber Bragg gratings (FBG) are around 1531 nm where the intensity of the ASE is large. In contrast to the optical interleaver having a periodic wavelength characteristic, the reflection wavelengths of the fiber Bragg gratings (FBG) need not be periodic. In the amplifiers of FIGS. 2 and 3, a number of fiber Bragg gratings (FBG) can be used rather than the transmission and isolation units 25 and 35 and the reflection mirrors 24 and 34 used for transmitting the optical signals while selectively reflecting the ASE.

Figure 7:
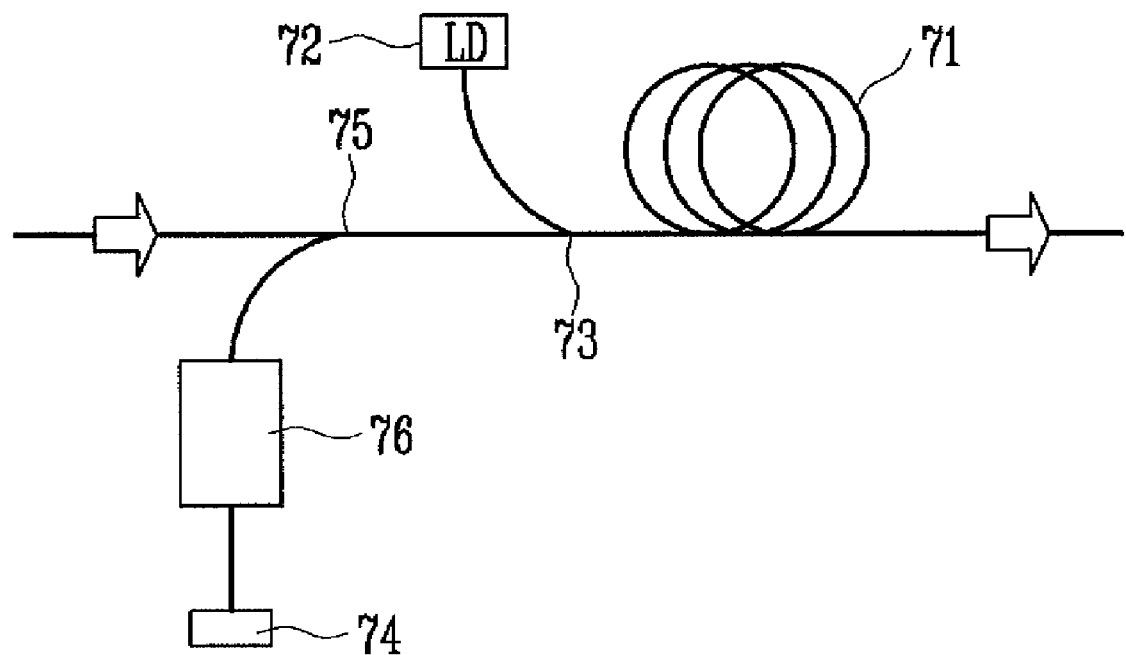
FIG. 7 is a schematic diagram of an amplified spontaneous emission (ASE) reflector-based gain-clamped fiber amplifier according to a third embodiment of the present invention.

FIG. 7 is a schematic diagram of an ASE reflector-based gain-clamped fiber amplifier according to a third embodiment of the present invention, in which an amplifier for amplifying the ASE is further included to increase a dynamic range.

As a gain medium 71 for amplifying an optical signal, for example, an Erbium-doped fiber (EDF) is used. A laser diode (LD) 72 provides pump light having a center wavelength of, for example, 980 nm, for population inversion of the gain medium 71, and a wavelength division multiplexing (WDM) coupler 73 couples the pump light provided from the laser diode (LD) 72 to the gain medium 71. In addition, a transmission and isolation units 75 is arranged at an input stage to periodically transmit the optical signal provided from the outside to send to the gain medium 71 through the WDM coupler 73 and send ASE having a different wavelength from the optical signal coming back from the gain medium 71 to a reflection mirror 74. An optical amplifier 76 is arranged between the transmission and isolation units 75 and the reflection mirror 74.

The reflection mirror 74 may be made of a typical mirror or an optical fiber having an end surface coated with dielectric, and the transmission and isolation units 75 may comprise, for example, an optical interleaver or an optical filter such as a CWDM.

When the pump light provided from the laser diode (LD) 72 is incident on the gain medium 71 through the WDM coupler 73, each atomic energy level of the gain medium 71 is changed from a ground state to an excited state. An excited atom emits light through stimulated emission, in which light having the same wavelength as the optical signal is emitted, and spontaneous emission, in which light having any wavelength is emitted, so that the atom returns to the ground state. Therefore, when the pump light is incident on the gain medium 71, the optical signal incident from the outside is amplified through the stimulated emission. At this time, light spontaneously emitted from the gain medium 71, i.e., the ASE propagating in the opposite direction to the pump light, is isolated by the transmission and isolation units 75 and directed toward the reflection mirror 74 where it is reflected back toward the gain medium 71 to be amplified. Here, the optical amplifier 76 amplifies the ASE reflected by the reflection mirror 74, so that a complementary interaction between the input optical signal and the reflected ASE in the gain medium 71 is effectively increased. Thus, the gain of the optical signal can be maintained constant more effectively. In other words, since the ASE is amplified before and after being reflected from the reflection mirror 74, the intensity of the ASE incident on the gain medium 71 is significantly increased. Therefore, the dynamic range of the fiber amplifier is increased in proportion to the intensity of the reflect ASE reflected incident again on the gain medium 71, so that the dynamic range can be significantly increased according to the present embodiment. Further, as the intensity of the ASE increases, the population inversion of the gain medium 71 decreases so that the noise figure increases compared to an optical amplifier that does not employ ASE amplification.

Further, the third embodiment of the present invention shown in FIG. 7 can be applied to the fiber amplifier shown in FIG. 3. In other words, the same effect can be obtained with the optical amplifier 76 of FIG. 7 arranged between the transmission and isolation unit 35 and the reflection mirror 34 of the fiber amplifier shown in FIG. 3.

In addition, to increase the characteristic of the noise figure of the present invention, an ASE reflector-based gain-clamped fiber amplifier is provided further including a preamplifier for amplifying an input optical signal at an input stage of the fiber amplifier shown in FIGS. 2, 3, and 7.

Referring to FIG. 5B, it will be appreciated that the noise figure for the fiber amplifier shown in FIGS. 2 and 3 is larger than that for the amplifier without the clamped gain. In addition, for the fiber amplifier shown in FIG. 7, it will be appreciated that the ASE having a large intensity is incident on the gain medium by the ASE amplifier arranged between the transmission and isolation unit 35 and the reflection mirror 34, so that a dynamic range can be expanded. However, the population inversion at the input stage of the gain medium is lowered so that the noise figured grows larger than in the embodiments of FIGS. 2 and 3. Therefore, when the amplifier with which population inversion is high and constant gain can be obtained irrespective of the intensity of the input optical signal is added to the input stage of the fiber amplifier according to the present invention, the gain-clamped characteristic can be maintained while reducing the noise figure. This can be done by simply arranging the preamplifier at the input stage of the fiber amplifier shown in any of FIGS. 2, 3, and 7.

As described above, the present invention includes transmission and isolation means for periodically transmitting an optical signal or reflecting amplified spontaneous emission (ASE) to send to a gain medium. By using an optical interleaver or a number of fiber Bragg gratings as the transmission and isolation means, the optical signal can be amplified across the entire C-band and a dynamic range can be increased beyond that of conventional fiber amplifiers. In addition, with a preamplifier arranged at an input stage of the ASE reflector-based gain-clamped fiber amplifier as described above, a noise figure can be effectively reduced.

Exemplary embodiments of the present invention have been described with reference to the attached drawings. However those skilled in the art will appreciate that various modifications can be made to the described embodiments without departing from the spirit of the invention. For example, the location and type of the laser diode (LD), the length of an Erbium-doped fiber, and the location of an optical isolator can be adjusted. In addition, the principle of the present invention can be applied to other rare earth element-doped optical amplifiers, i.e., thulium doped fiber or halide oxides active fiber can also be applied. Therefore, the scope of the present invention should be determined by the appended claims and their equivalents.

What is claimed is:

1. An amplified spontaneous emission (ASE) reflector-based gain-clamped fiber amplifier, comprising:
   a gain medium for amplifying an input optical signal at a clamped gain;
   a laser diode for supplying pump light to perform population inversion of the gain medium such that the optical signal is amplified through stimulated emission, and such that ASE propagating in the same direction as the pump light and having a different wavelength from the optical signal is emitted from the gain medium;
   a coupler for coupling the pump light to the gain medium; and
   a transmission and isolation unit configured so as to allow amplification across an entire C-band range, the transmission and isolation unit being configured to periodically transmit the amplified optical signal from the gain medium to output to the outside, isolate ASE propagating in the direction of pump light and having a different wavelength from the optical signal and reflect the ASE propagating in the direction of the pump light so that it propagates back to the gain medium and contributes to the gain.

2. The amplified spontaneous emission (ASE) reflector-based gain-clamped fiber amplifier according to claim 1, wherein the transmission and isolation unit comprises:
   a reflection mirror; and
   an optical interleaver for periodically transmitting the optical signal, isolating the ASE to send to the reflection mirror, and sending the ASE reflected by the reflection mirror to the gain medium.

3. An amplified spontaneous emission (ASE) reflector-based gain-clamped fiber amplifier, comprising:
   a gain medium used for amplifying an optical signal;
   a laser diode for supplying pump light to perform population inversion of the gain medium;
   a coupler for coupling the pump light to the gain medium; and
   transmission and isolation unit for periodically transmitting the optical signal amplified from the gain medium to output to the outside, and reflecting ASE having a different wavelength from the optical signal back to the gain medium, wherein the transmission and isolation unit comprises:
   a reflection mirror; and
   an optical interleaver for periodically transmitting the optical signal, isolating the ASE to send to the reflection mirror, and sending the ASE reflected by the reflection mirror to the gain medium; and
   an amplifier located between the reflection mirror and the optical interleaver for amplifying the ASE.

4. The amplified spontaneous emission (ASE) reflector-based gain-clamped fiber amplifier according to claim 1, wherein the transmission and isolation unit comprises a number of optical fiber Bragg gratings.

5. The amplified spontaneous emission (ASE) reflector-based gain-clamped fiber amplifier according to claim 1, wherein the gain medium is made of an Erbium-doped optical fiber, a rare earth ion-doped optical fiber, an optical fiber Raman amplifier, or a semiconductor optical amplifier.

6. An amplified spontaneous emission (ASE) reflector-based gain-clamped fiber amplifier, comprising:
   a gain medium used for amplifying an optical signal;
   a laser diode for supplying pump light to perform population inversion of the gain medium;
   a coupler for coupling the pump light to the gain medium;
   transmission and isolation unit for periodically transmitting the optical signal amplified from the gain medium to output to the outside, and reflecting ASE having a different wavelength from the optical signal back to the gain medium; and
   an amplifier arranged at an input stage for amplifying the optical signal provided from the outside.

7. An amplified spontaneous emission (ASE) reflector-based gain-clamped fiber amplifier, comprising:
   a gain medium used for amplifying an optical signal at a clamped gain;
   a laser diode for supplying pump light to perform population inversion of the gain medium;
   a coupler for coupling the pump light to the gain medium;
   a first transmission and isolation unit for periodically transmitting an optical signal provided from the outside to send to the gain medium, and reflecting ASE having a different wavelength from the optical signal back to the gain medium; and
   a second transmission and isolation unit for periodically transmitting the optical signal amplified from the gain medium to output to the outside, and reflecting ASE having a different wavelength from the optical signal back to the gain medium
   wherein the first and second transmission and isolation units are configured such that the ASE reflected by the first transmission and isolation unit has a different wavelength than the ASE reflected by the second transmission and isolation unit, and the ASE reflected by each of the first and second transmission and isolation unit contributes to the gain.

8. The amplified spontaneous emission (ASE) reflector-based gain-clamped fiber amplifier according to claim 7, wherein each of the first and second transmission and isolation units comprises:
- a reflection mirror; and
- an optical interleaver for periodically transmitting the optical signal, isolating the ASE to send to the reflection mirror, and sending the ASE reflected by the reflection mirror to the gain medium.

9. An amplified spontaneous emission (ASE) reflector-based gain-clamped fiber amplifier, comprising:
- a gain medium used for amplifying an optical signal at a clamped gain;
- a laser diode for supplying pump light to perform population inversion of the gain medium;
- a coupler for coupling the pump light to the gain medium;
- first transmission and isolation unit for periodically transmitting an optical signal provided from the outside to send to the gain medium, and reflecting ASE having a different wavelength from the optical signal back to the gain medium; and
- second transmission and isolation unit for periodically transmitting the optical signal amplified from the gain medium to output to the outside, and reflecting ASE having a different wavelength from the optical signal back to the gain medium, wherein each of the first and second transmission and isolation units comprises:
  - a reflection mirror; and
  - an optical interleaver for periodically transmitting the optical signal, isolating the ASE to send to the reflection mirror, and sending the ASE reflected by the reflection mirror to the gain medium; and
  - an amplifier located between the reflection mirror and the optical interleaver for amplifying the ASE.

10. The amplified spontaneous emission (ASE) reflector-based gain-clamped fiber amplifier according to claim 7, wherein each of the first and second transmission and isolation unit comprises a number of optical fiber Bragg gratings.

11. The amplified spontaneous emission (ASE) reflector-based gain-clamped fiber amplifier according to claim 7, wherein the gain medium is made of an Erbium-doped optical fiber, a rare earth ion-doped optical fiber, an optical fiber Raman amplifier, or a semiconductor optical amplifier.

12. An amplified spontaneous emission (ASE) reflector-based gain-clamped fiber amplifier, comprising:
- a gain medium used for amplifying an optical signal at a clamped gain;
- a laser diode for supplying pump light to perform population inversion of the gain medium;
- a coupler for coupling the pump light to the gain medium;
- a first transmission and isolation unit for periodically transmitting an optical signal provided from the outside to send to the gain medium, and reflecting ASE having a different wavelength from the optical signal back to the gain medium;
- a second transmission and isolation unit for periodically transmitting the optical signal amplified from the gain medium to output to the outside, and reflecting ASE having a different wavelength from the optical signal back to the gain medium; and
- an amplifier arranged at an input stage for amplifying the optical signal provided from the outside.

\* \* \* \* \*